(12) United States Patent
DeBruler

(10) Patent No.: US 9,541,150 B2
(45) Date of Patent: Jan. 10, 2017

(54) END MEMBERS AND GAS SPRING ASSEMBLIES INCLUDING SAME

(71) Applicant: Firestone Industrial Products Company, LLC, Indianapolis, IN (US)

(72) Inventor: Brian S. DeBruler, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/013,394

(22) Filed: Aug. 29, 2013

(65) Prior Publication Data

US 2014/0061983 A1     Mar. 6, 2014

(51) Int. Cl.
*F16F 9/05* (2006.01)
*B60G 11/27* (2006.01)
*F16F 9/32* (2006.01)

(52) U.S. Cl.
CPC .................. *F16F 9/05* (2013.01); *B60G 11/27* (2013.01); *F16F 9/3292* (2013.01); *B60G 2202/152* (2013.01); *B60G 2204/126* (2013.01)

(58) Field of Classification Search
CPC ........... F16F 9/05; F16F 9/3292; B60G 11/27; B60G 2204/126; B60G 2202/152
USPC ... 267/64.27, 124, 122, 64.19, 64.21, 64.23, 267/64.24
See application file for complete search history.

(56) References Cited

U.S. PATENT DOCUMENTS

| 4,378,935 | A | * | 4/1983 | Brown et al. ............... 267/64.27 |
| 4,398,704 | A | * | 8/1983 | Buchanan et al. ......... 267/64.21 |
| 5,374,037 | A | * | 12/1994 | Bledsoe ..................... 267/64.27 |
| 6,336,610 | B1 | * | 1/2002 | Wode ........................ 244/100 R |
| 6,561,500 | B2 | * | 5/2003 | Schisler et al. ............ 267/64.27 |
| 6,926,264 | B1 | * | 8/2005 | Trowbridge ............... 267/64.27 |
| 7,918,316 | B2 | * | 4/2011 | Beier .......................... 184/6.23 |
| 2005/0236749 | A1 | * | 10/2005 | Gross et al. .................. 267/122 |
| 2008/0111288 | A1 | * | 5/2008 | Howard et al. ............ 267/64.27 |
| 2009/0278289 | A1 | * | 11/2009 | Gawinski et al. ......... 267/64.27 |
| 2010/0252970 | A1 | * | 10/2010 | Leonard ..................... 267/64.21 |

* cited by examiner

*Primary Examiner* — Thomas J Williams
*Assistant Examiner* — Mariano Sy
(74) *Attorney, Agent, or Firm* — Thomas R. Kingsbury; Fay Sharpe LLP

(57) ABSTRACT

End members are dimensioned for securement to a flexible wall of a gas spring assembly. The end members can include an end wall, and inner and outer crimp walls that extend from the end wall and are disposed in spaced relation to one another such that gap is formed therebetween. A plurality of connector walls extend between and operatively interconnect the inner and outer crimp walls. Gas spring assemblies including such an end member and suspension systems including one or more of such gas spring assemblies are also included.

20 Claims, 5 Drawing Sheets

END MEMBERS AND GAS SPRING ASSEMBLIES INCLUDING SAME

This application claims priority from U.S. Provisional Patent Application No. 61/696,060 filed on Aug. 31, 2012, which is hereby incorporated herein by reference in its entirety.

BACKGROUND

The subject matter of the present disclosure broadly relates to the art of gas spring devices and, more particularly, to end members including a crimp area having improved structural integrity as well as gas spring assemblies including such an end member. Additionally, suspension systems can include one or more of such gas spring assemblies.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Gas spring assemblies of various types, kinds and constructions are well known and commonly used. Additionally, known gas spring assemblies are typically available in a wide variety of sizes and load capacities. Even so, gas spring applications continue to be developed that demand greater gas spring performance, often in increasingly smaller packages. In many cases, such performance advancements include increased load capacity. One way that the load capacity of a given gas spring assembly can be improved is by increasing the gas pressure within the spring chamber thereof. In some cases, known gas spring constructions that utilize metal end members and crimped metal ring connections may be capable of operation at such increased gas pressure levels.

In addition to performance increases, there is also a continuing trend to reduce overall weight of vehicle suspension systems, and reducing the weight of gas spring assemblies can be one contributing factor to achieving targeted weight reduction goals. As such, end members for gas spring assemblies are commonly formed from polymeric materials, such as fiber-reinforced thermoplastics. However, such constructions can result in a corresponding reduction in strength and rigidity, which can be problematic in applications in which increased gas spring performance is desired.

Consequently, a need exists to meet these competing goals while still retaining comparable or improved performance, low cost of manufacture, ease of assembly and/or other desired features of gas spring assemblies.

BRIEF SUMMARY

One example and the end member in accordance with the subject matter of the present disclosure can be dimensioned for securement to an associated flexible wall for forming an associated gas spring assembly. The end member can include an end wall having a longitudinal axis and extending outwardly to an outer peripheral edge. An outer crimp wall can extend axially from along the end wall and can include an outer surface that is dimensioned to receive a portion of the associated flexible wall. An inner crimp wall can be disposed radially inward from the outer crimp wall such that a Is formed between the inner crimp wall and the outer crimp wall. The inner crimp wall can extend axially from along the end wall in a common direction with the outer crimp wall such that at least a portion of the inner crimp wall is co-extensive with at least a portion of the outer crimp wall. A plurality of connector walls can extend between and operatively interconnect the outer crimp wall and the inner crimp wall.

One example of a gas spring assembly in accordance with the subject matter of the present disclosure can include a flexible wall having a longitudinal axis and extending peripherally about the longitudinal axis between opposing first and second ends and at least partially defining a spring chamber. A first end member can be secured across the first end of the flexible wall such that a substantially fluid tight seal is formed therebetween. The first end member can include an end wall extending transverse to the axis and having an outer peripheral edge. An outer crimp wall can extend from along the end wall and can include an outer surface abuttingly engaging portion of the flexible wall. An inner crimp wall can be disposed in inwardly-spaced relation to the outer crimp wall such that a gap is formed between the inner crimp wall and the outer crimp wall. The inner crimp wall can extend axially from along the end wall in a common direction with the outer crimp wall such that at least a portion of the inner crimp wall is co-extensive with at least a portion of the outer crimp wall. A plurality of connector walls can extend between and operatively interconnect the outer crimp wall and the inner crimp wall. A second end member can be disposed in spaced relation to the first end member and can be secured across the second end of the flexible wall such that a substantially fluid tight seal is formed therebetween.

One example of a suspension system in accordance with the subject matter of the present disclosure can include a pressurized gas system including a pressurized gas source and a control device in fluid communication with the pressurized gas source. At least one gas spring assembly in accordance with the foregoing paragraph can be disposed in fluid communication with the pressurized gas source through the control device.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
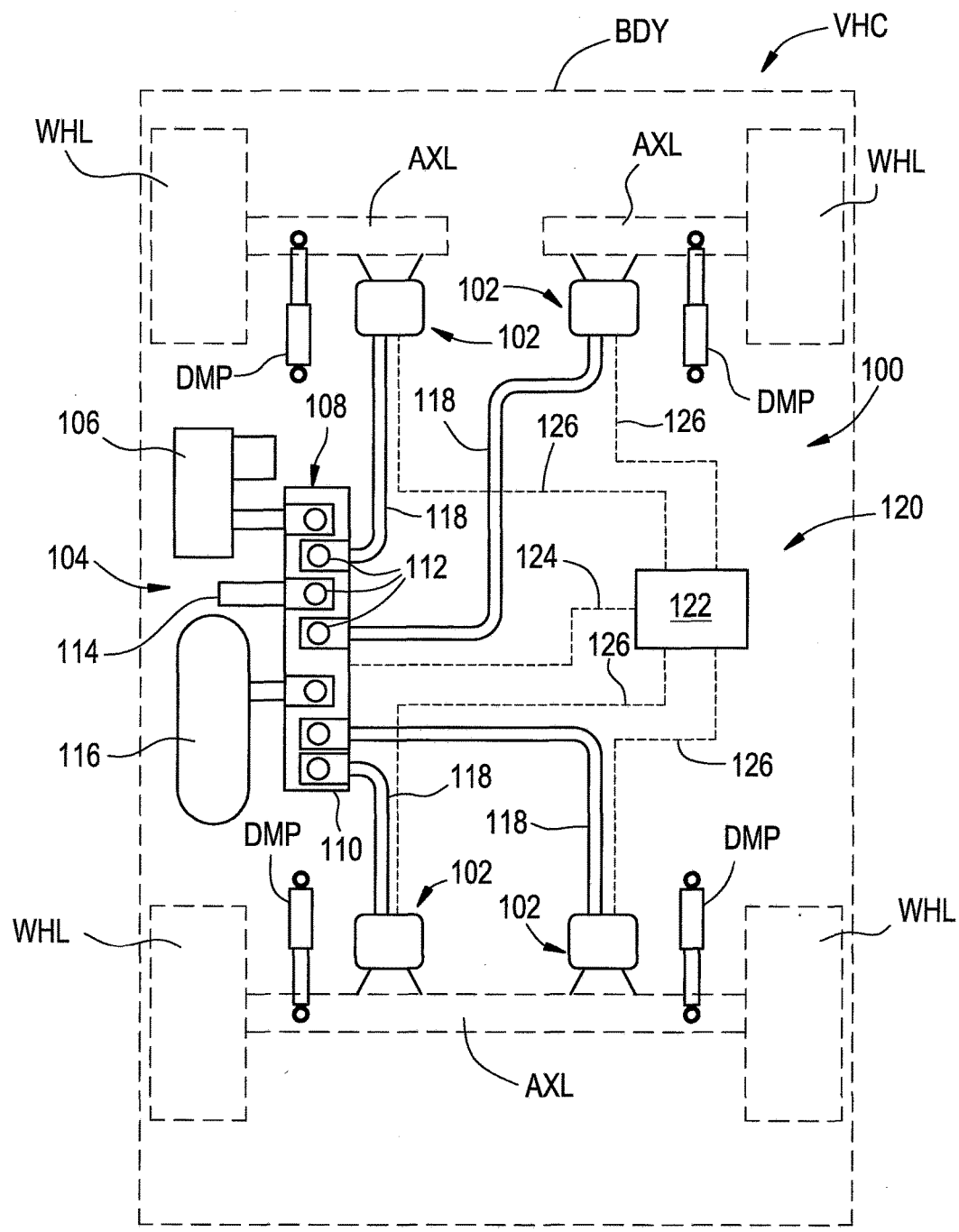
FIG. 1 is a schematic representation of one example of a suspension system of an associated vehicle including a gas spring assembly in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will also be appreciated that such a suspension system of the vehicle can also optionally include a plurality of damping members, such as dampers DMP, for example, and that any such damping members can also be operatively connected between the sprung and unsprung masses of the associated vehicle in any suitable manner.

The suspension system can also include a plurality of gas spring assemblies supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of other types, kinds and/or constructions could alternately be used.

Suspension system 100 also includes a pressurized gas system 104 operatively associated with the gas spring assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas.

Valve assembly 108 is in communication with gas spring assemblies 102 through suitable gas transfer lines 118. As such, pressurized gas can be selectively transferred into and/or out of the gas spring assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices (not shown in FIG. 1), such as, for example, may be operatively associated with the gas spring assemblies and capable of outputting or otherwise generating data, signals and/or other communications having a relation to a height of the gas spring assemblies or a distance between other components of the vehicle. Such height sensing devices can be in communication with ECU 122, which can receive the height or distance signals therefrom. The height sensing devices can be in communication with ECU 122 in any suitable manner, such as through conductors or leads 126, for example. Additionally, it will be appreciated that the height sensing devices can be of any suitable type, kind and/or construction.

Figure 2:
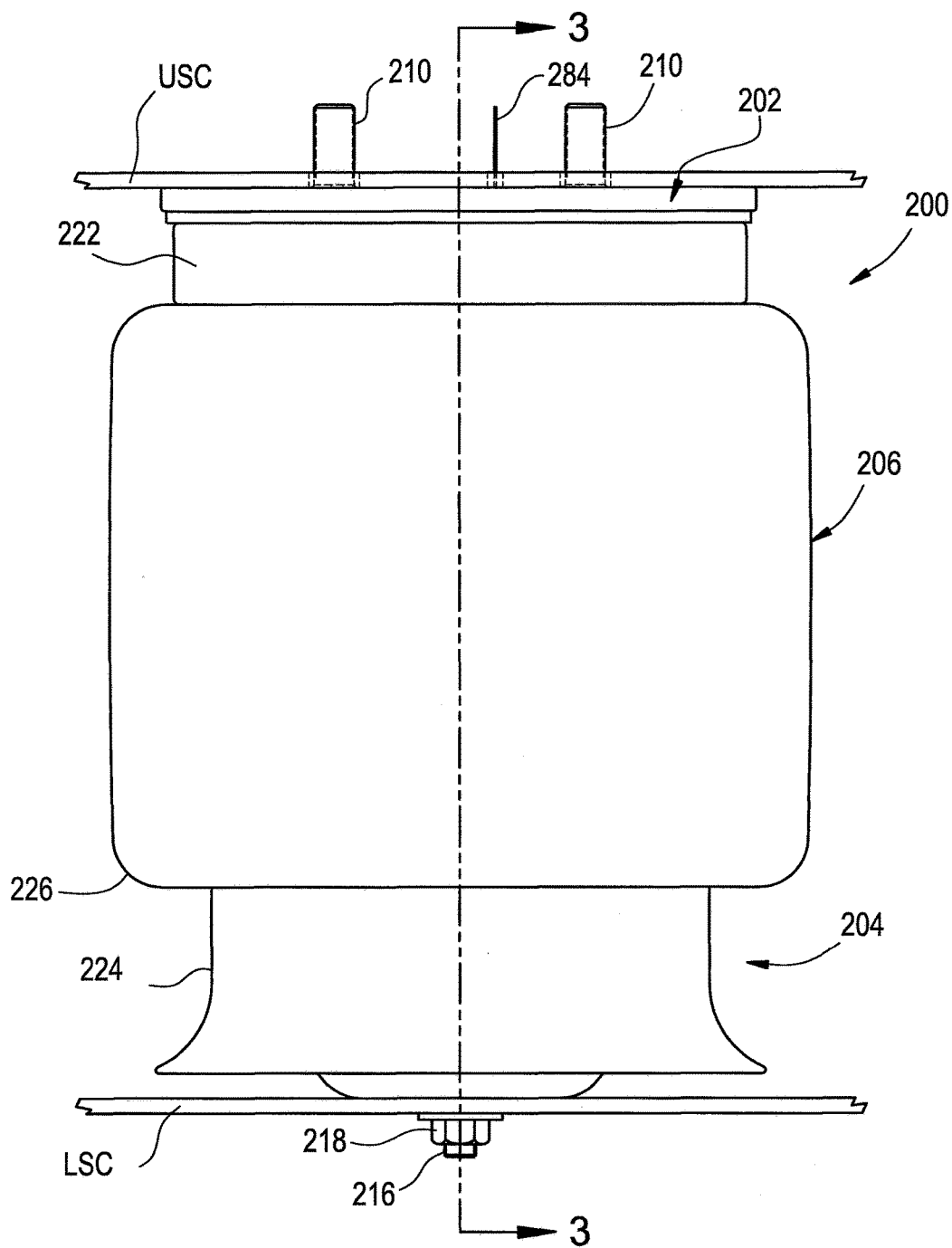
FIG. 2 is a side elevation view of one example of a gas spring assembly that includes one example of an end member in accordance with the subject matter of the present disclosure.
Figure 3:
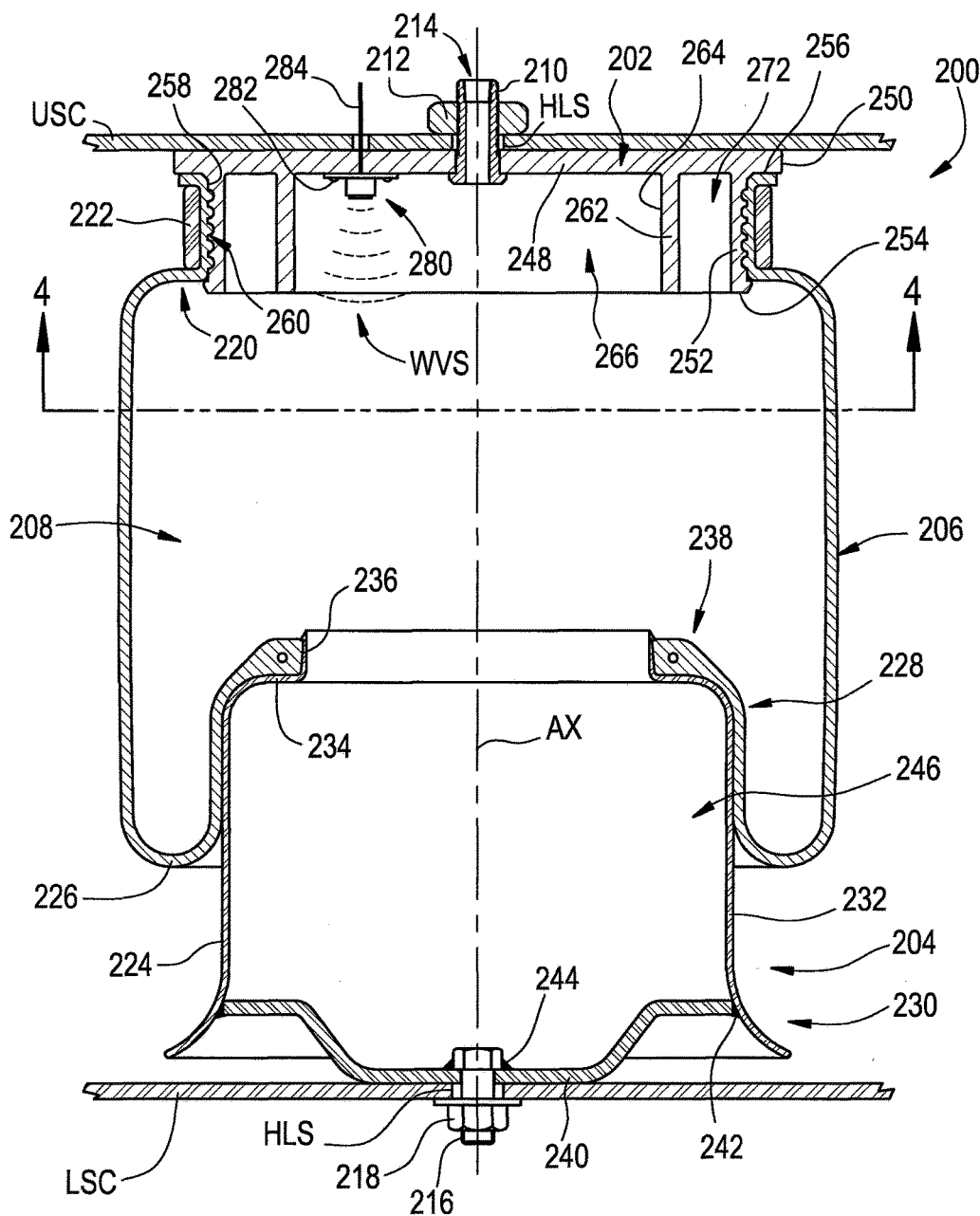
FIG. 3 is a cross-sectional side view of the gas spring assembly in FIG. 2 taken from along line 3-3 in FIG. 2.
Figure 4:
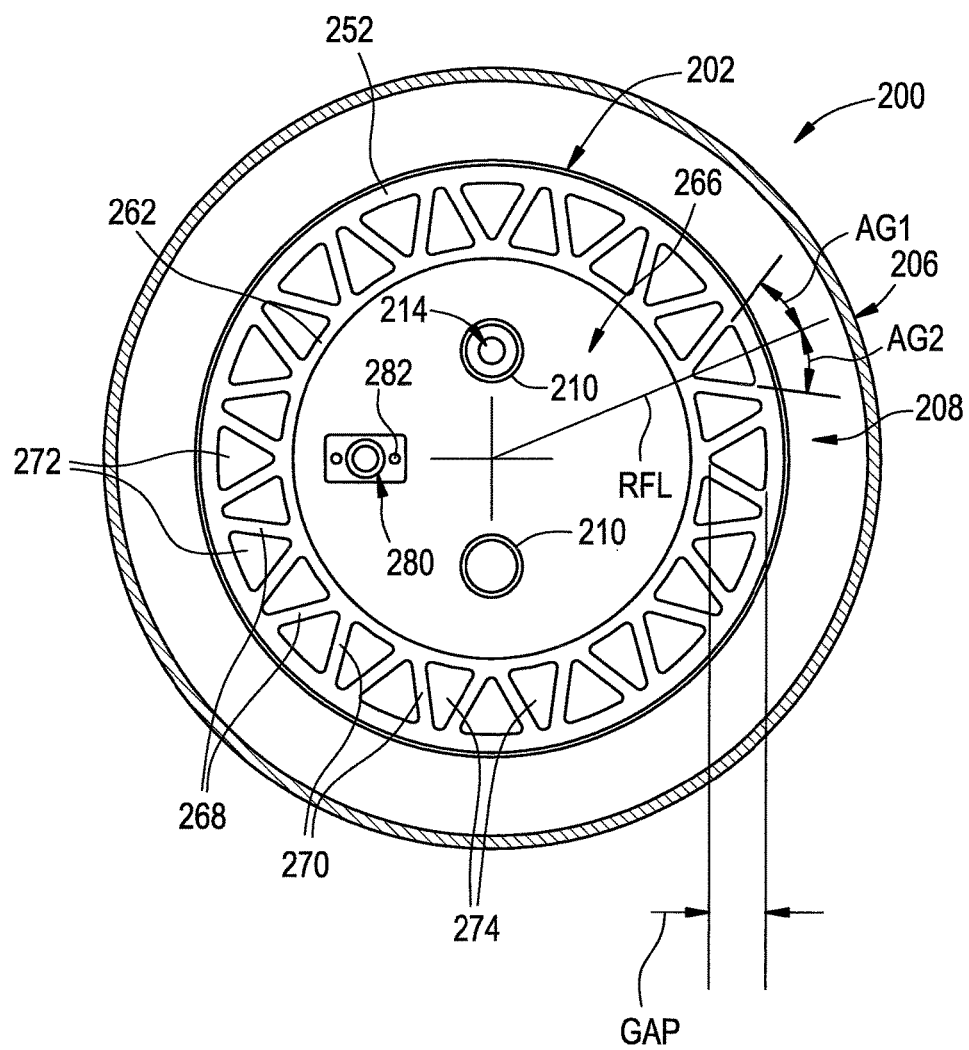
FIG. 4 is a bottom plan view of an end member in accordance with the subject matter of the present disclosure viewed from along line 4-4 in FIG. 3.

One example of a gas spring assembly 200 in accordance with the subject matter of the present disclosure is shown in FIGS. 2-4 as having a longitudinally-extending axis AX (FIG. 3) and can include one or more end members, such as an end member 202 and an end member 204 that is spaced longitudinally from end member 202. A flexible wall 206 can extend peripherally around axis AX and can be secured between the end members in a substantially fluid-tight manner such that a spring chamber 208 (FIG. 3) is at least partially defined therebetween.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. In the arrangement shown in FIGS. 2-4, for example, end member 202 is secured along a first or upper structural component USC, such as associated vehicle body BDY in FIG. 1, for example, and can be secured thereon in any suitable manner. For example, one or more securement devices, such as mounting studs 210, for example, can be included along end member 202. In some cases, the one or more securement devices (e.g., mounting studs 210) can project outwardly from end member 202 and can be secured thereon in a suitable manner, such as, for example, by way of a flowed-material joint (not shown) or a press-fit connection (not identified). Additionally, such one or more securement devices can extend through mounting holes HLS in upper structural component USC and receive one or more threaded nuts 212 (FIG. 3) or other securement devices, for example. As an alternative to one or more of mounting studs 210, one or more threaded passages (e.g., blind passages and/or through passages) could be used in conjunction with a corresponding number of one or more threaded fasteners.

Additionally, a fluid communication port, such as a transfer passage 214 (FIG. 3), for example, can optionally be provided to permit fluid communication with spring chamber 208, such as may be used for transferring pressurized gas into and/or out of the spring chamber, for example. In the exemplary embodiment shown, transfer passage 214 extends through at least one of mounting studs 210 and is in fluid communication with spring chamber 208. It will be appreciated, however, that any other suitable fluid communication arrangement could alternately be used.

End member 204 can be secured along a second or lower structural component LSC, such as an axle AXL in FIG. 1, for example, in any suitable manner. As one example, lower structural component LSC could include one or more mounting holes HLS extending therethrough. In such case, a mounting stud 216 could be operatively connected to end member 204 and could extend through one of mounting holes HLS to receive a corresponding threaded nut 218, for example.

It will be appreciated that the one or more end members can be of any suitable type, kind, construction and/or configuration, and can be operatively connected or otherwise secured to the flexible wall in any suitable manner. In the exemplary arrangement shown in FIGS. 2-4, for example, end member 202 is of a type commonly referred to as a top cap or top plate and is secured to a first end 220 of flexible wall 206 using a retaining ring 222 that can be crimped or otherwise radially-inwardly deformed to capture at least a portion of flexible wall 206 between the end member and the retaining ring. End member 204 is shown in the exemplary arrangement in FIGS. 2 and 3 as being of a type commonly referred to as a piston (or a roll-off piston) that has an outer surface 224 that abuttingly engages flexible wall 206 such that a rolling lobe 226 is formed therealong. As gas spring assembly 200 is displaced between extended and collapsed conditions, rolling lobe 226 is displaced along outer surface 224 in a conventional manner.

As identified in FIG. 3, end member 204 extends generally between a first or upper end 228 and a second or lower end 230. End member 204 can include a longitudinally-extending outer side wall 232 that extends peripherally about axis AX and at least partially defines outer surface 224. End member 204 can also include an end wall 234 disposed along end 228 that extends generally transverse to axis AX. One example of a connection between the flexible wall and the end member is shown in FIG. 3 in which end member 204 includes an inner side wall 236 that can extend longitudinally outward from end wall 234 in a direction away from end 230. Flexible wall 206 can include a second end 238 that is received along inner side wall 236 such that a substantially fluid-tight seal is formed therebetween. It is to be understood, however, that the arrangement shown and described is merely exemplary and that any other suitable construction and/or configuration can alternately be used.

End member 204 can also include a bottom wall 240 that is disposed along end 230 of the end member and can be secured on or along outer side wall 232 in any manner suitable for forming a substantially fluid-tight connection, such as by using a flowed-material joint 242, for example. In some cases, mounting stud 216 can be operatively connected to bottom wall 240 in a manner suitable for forming a substantially fluid-tight seal therewith, such as by using a flowed-material joint 244, for example. Additionally, end member 204 can include a chamber 246 that is formed therein and in fluid communication with spring chamber 208. In the exemplary arrangement shown, chamber 246 is at least partially defined by outer side wall 232, end wall 234, inner side wall 236 and bottom wall 240.

End member 202 can include an end wall 248 that can be substantially planar and extend outwardly to an outer peripheral edge 250. End member 202 can also include a first or outer crimp wall 252 that extends axially from along end wall 248 toward a distal edge 254. In some cases, outer crimp wall 252 can be spaced radially inward from outer peripheral edge 250 such that a shoulder wall 256 can be formed along end member 202. Outer crimp wall 252 can, optionally, include one or more engagement features disposed along an outer surface 258 thereof that may be suitable for engaging a surface of flexible wall 206 to thereby enhance retention of the flexible wall and end member in an assembled condition. As one example, the one or more features disposed on or along the outer surface of outer crimp wall 252 can include a plurality of axially-spaced, endless, annular grooves 260. It will be appreciated, however, that other configurations and/or arrangements could alternately be used.

In some cases, outer crimp wall 252 can take the form of an endless annular wall that extends circumferentially about end member 202 in radially-inwardly spaced relation to outer peripheral edge 250. In some cases, outer crimp wall 252 can project outwardly from end wall 248 in a transverse (e.g., perpendicular) orientation relative to the end wall, such as is shown in FIGS. 2-4, for example. End member 202 can also include a second or inner crimp wall 262 that is spaced radially-inward from outer crimp wall 252 such that radial gap GAP (FIG. 4) is formed therebetween. Inner crimp wall 262 can extend outwardly from along end wall 248 toward a distal edge (not identified), which, in some cases, can be disposed in alignment with distal edge 254 of the outer crimp wall, such as is shown in FIG. 3, for example. In such cases, the distal edge of inner crimp wall 262 can, optionally, be disposed in a common plane with distal edge 254 of outer crimp wall 252. Additionally, in a preferred arrangement, at least a portion of inner crimp wall 262 can be co-extensive (i.e., extending in axially-overlapping relation with one another) with outer crimp wall 252.

Inner crimp wall 262 can include an inside surface 264 that can at least partially define an end member cavity 266. In some cases, inner crimp wall 262 can take the form of an endless annular wall that extends circumferentially about end member 202 in radially-inwardly spaced relation to outer crimp wall 252. In some cases, inner crimp wall 262 can project outwardly from end wall 248 in a transverse (e.g., perpendicular) orientation relative to the end wall. It will be appreciated, however, that other configurations and/or arrangements could alternately be used.

End member 202 also includes a plurality of connector walls that extend between and rigidly interconnect outer crimp wall 252 and inner crimp wall 262. It will be appreciated that the connector walls can take a variety of configurations and/or arrangements. As one example, end member 202 is shown in FIG. 4 as including a first plurality of connector walls 268 that are oriented in a first direction relative to the outer and inner crimp walls. End member 202 also includes a second plurality of connector walls 270 that are oriented in a second direction relative to the outer and inner crimp walls. It will be recognized and appreciated that the orientation of connector walls 268 and 270 rotates about axis AX such that a substantially uniform angle relative to radial reference lines RFL (only one of which is shown in FIG. 4) is maintained for each connector wall. In some cases, connector walls 268 and 270 can be disposed at equal but opposite angles relative to any given reference line RFL, such as is represented in FIG. 4 by angular dimensions AG1 and AG2, for example. In this manner, connector walls 268 and 270 extend between outer crimp wall 252 and inner crimp wall 262 to form a plurality of cavities having one of two different shapes and sizes, such as are identified as cavities 272 and 274, for example. Additionally, in the arrangement shown in FIG. 4, adjacent ones of cavities 272 and 274 have alternating sizes and shapes with respect to one another.

Figure 5:
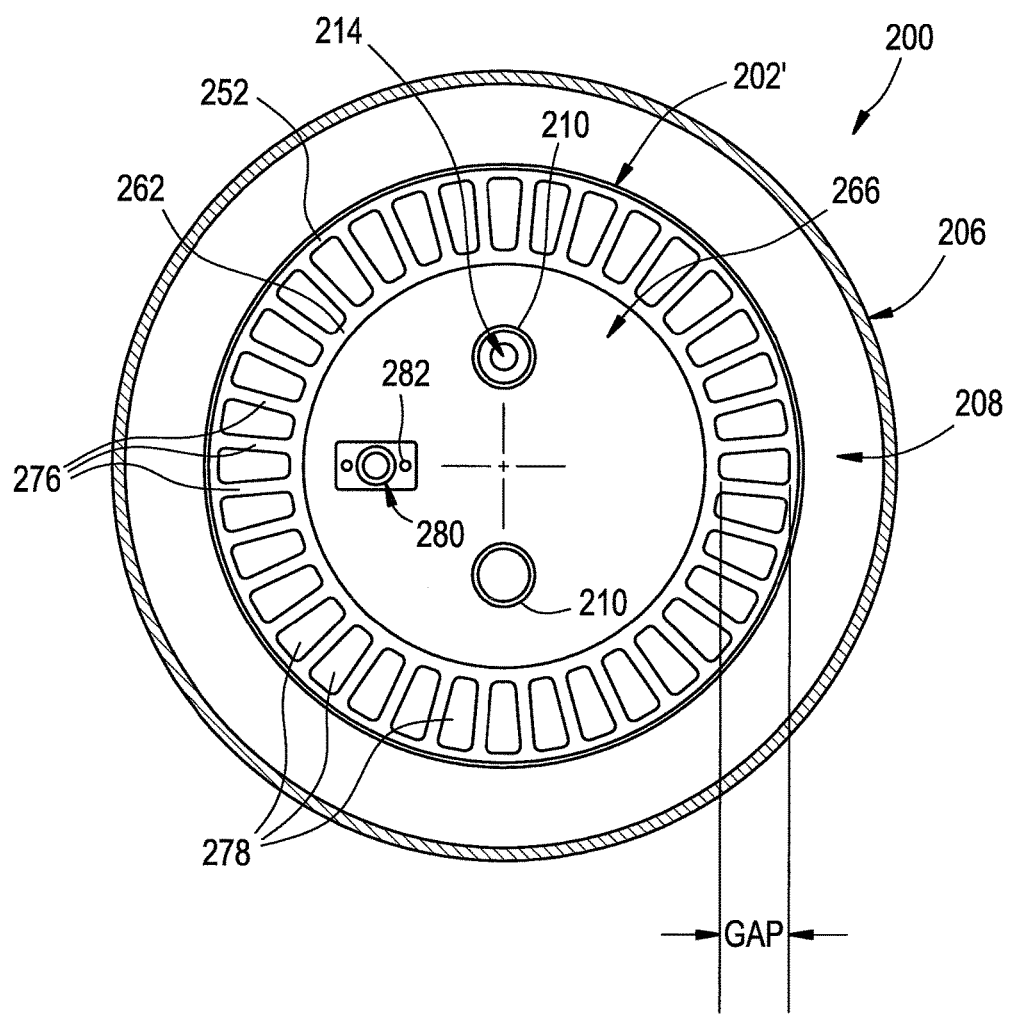
FIG. 5 is a bottom plan view of an alternate construction of the end member in FIGS. 2-4.

An alternate configuration of end member 202 is shown in FIG. 5 as end member 202'. It will be appreciated that end member 202' can be substantially similar to end member 202, such as has been shown and described herein in connection with FIGS. 2-4. End member 202' differs from end member 200 in the configuration of the plurality of connector walls that extend between and rigidly interconnect outer crimp wall 252 and inner crimp wall 262. As shown in FIG. 5, a plurality of connector walls 276 extend between and rigidly interconnect the outer and inner crimp walls. Connector walls 276 are disposed in a substantially radial orientation. As such, a plurality of cavities 278 are formed by adjacent ones of the connector walls between outer and inner crimp walls 252 and 262. In the arrangement shown in FIG. 5, cavities 278 are shown as having an approximately uniform and/or common size and shape.

As indicated above, outer crimp wall 252 is rigidly interconnected with inner crimp wall 262 by the plurality of connector walls (e.g., connector walls 268 and 270 or connector walls 276) and form a composite beam-like structure. As such, increased strength and rigidity of outer crimp wall 252 can be achieved without the use of metal backing rings to buttress the crimp wall during assembly operations and/or in an assembled condition.

In a preferred arrangement, an end member in accordance with the subject matter of the present disclosure can be formed from a polymeric material. It will be appreciated that the end member can be formed from any suitable polymeric material or combination of polymeric materials. For example, end members 202 and/or 202' can be formed from a substantially rigid polymeric material, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example.

A height or distance sensing device 280 is, optionally, shown in FIGS. 2-5 as being disposed within spring chamber 208 along end member 202 (and 202') and being secured thereto using suitable fasteners 282. Height sensing device 280 can be of any suitable type, kind and/or construction, such as an ultrasonic sensor that transmits and receives ultrasonic waves WVS (FIG. 3), for example. Additionally, it will be appreciated that height sensing device 280 can be connected to other systems and/or components of a vehicle suspension system in any suitable manner. As shown in FIGS. 2 and 3, height sensing device 280 includes a lead or connection 284 that can be used for such communication purposes, such as is indicated by leads 126 of control system 120 in FIG. 1, for example.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood that claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:
1. An end member dimensioned for securement to an associated flexible wall for forming an associated gas spring assembly, said end member comprising:
an end wall having a longitudinal axis and extending outwardly to an outer peripheral edge;
an outer crimp wall extending axially from along said end wall and including an outer surface dimensioned to receive a portion of the associated flexible wall;
an inner crimp wall disposed radially inward from said outer crimp wall such that a gap is formed between said inner crimp wall and said outer crimp wall, said gap having a circumference extending substantially-entirely about said longitudinal axis, said inner crimp wall extending axially from along said end wall in a common direction with said outer crimp wall such that at least a portion of said inner crimp wall is co-extensive with said outer crimp wall; and,
a plurality of pairs of first and second connector walls extending between and operatively interconnecting said outer crimp wall and said inner crimp wall across said gap therebetween, each of said plurality of pairs of first and second connector walls having an associated radial reference line with said first connector wall disposed at a first angle relative to the associated radial reference line and said second connector wall disposed at a second angle relative to the associated radial reference line that is approximately equal but opposite to said first angle such that a first cavity is formed between said first and second connector walls and at least one of said inner and outer crimp walls;
said plurality of pairs of first and second connector walls disposed in circumferentially-spaced relation to one another about said longitudinal axis such that a plurality of first cavities are disposed in spaced relation to one another about said longitudinal axis with a second cavity formed by said first connector wall of one pair and said second connector wall of an adjacent pair together with at least the other one of said inner and outer crimp walls such that a plurality of second cavities are disposed about said longitudinal axis, said plurality of first cavities having an approximately common size and shape and said plurality of second cavities having an approximately common size and shape that is different from said size and shape of said plurality of first cavities with said pluralities of first and second cavities being interleaved with one another about said longitudinal axis and substantially-entirely along said circumference of said gap such that adjacent cavities have alternating sizes and shapes.

2. An end member according to claim 1, wherein said plurality of connector walls extend radially outwardly from said inner crimp wall to said outer crimp wall.

3. An end member according to claim 1, wherein said end member is formed from a polymeric material selected from the group consisting of a fiber-reinforced polypropylene, a fiber-reinforced polyamide, an unreinforced polyester, an unreinforced polyethylene, an unreinforced polyamide and an unreinforced polyether.

4. An end member according to claim 1, wherein said outer crimp wall extends from said end wall to a first distal edge, and said inner crimp wall extends from said end wall to a second distal edge.

5. An end member according to claim 4, wherein said first and second distal edges are disposed in an approximately common plane.

6. An end member according to claim 1, wherein said end wall and an inside surface of said inner crimp wall at least partially define an end member cavity disposed radially inward of said gap.

7. An end member according to claim 1, wherein said outer crimp wall includes an outer peripheral surface with one or more engagement features disposed along said outer peripheral surface and dimensioned for securement of the portion of the associated flexible wall.

8. An end member according to claim 7, wherein said one or more engagement features include a plurality of annular grooves extending into said outer crimp wall from along said outer peripheral surface.

9. An end member according to claim 1, wherein said outer crimp wall is spaced radially-inward from said outer peripheral edge of said end wall such that a shoulder wall is formed along said end member adjacent said outer crimp wall.

10. An end member according to claim 1, wherein said end wall is substantially planar and includes an inner surface and an outer surface with at least one securement device being accessible from along said outer surface of said end wall.

11. An end member according to claim 1, wherein each of said plurality of first cavities is reflectionally symmetrical about the associated radial reference line thereof.

12. An end member according to claim 1, wherein said plurality of first cavities have an approximately triangular shape with a base oriented radially outward and at least partially formed by said outer crimp wall, and said plurality of second cavities have an approximately triangular shape with a base oriented radially inward and at least partially formed by said inner crimp wall.

13. A gas spring assembly comprising:
a flexible wall having a longitudinal axis and extending peripherally about said longitudinal axis between opposing first and second ends and at least partially defining a spring chamber;
a first end member secured across said first end of said flexible wall such that a substantially fluid tight seal is formed therebetween, said first end member including:
an end wall extending transverse to said axis and including an outer peripheral edge;
an outer crimp wall extending axially from along said end wall and including an outer surface abuttingly engaging a portion of said flexible wall;
an inner crimp wall disposed in inwardly-spaced relation to said outer crimp wall such that a gap is formed between said inner crimp wall and said outer crimp wall, said gap having a circumference extending substantially-entirely about said longitudinal axis, said inner crimp wall extending axially from along said end wall in a common direction with said outer crimp wall such that at least a portion of said inner crimp wall is co-extensive with at least a portion of said outer crimp wall; and,
a plurality of pairs of connector walls extending between and operatively interconnecting said outer crimp wall and said inner crimp wall across said gap therebetween, each of said plurality of pairs of connector walls having an associated radial reference line with a first connector wall disposed at a first angle relative to the associated radial reference line and a second connector wall disposed at a second angle relative to the associated radial reference line such that a first cavity is formed between said first and second connector walls and at least one of said inner and outer crimp walls;

said plurality of pairs of connector walls disposed in circumferentially-spaced relation to one another about said longitudinal axis such that a plurality of first cavities are disposed in spaced relation to one another about said longitudinal axis with a second cavity formed by said first connector wall of one pair and said second connector wall of an adjacent pair together with at least the other one of said inner and outer crimp walls such that a plurality of second cavities are disposed about said longitudinal axis, said plurality of first cavities having an approximately common size and shape and said plurality of second cavities having an approximately common size and shape that is different from said size and shape of said plurality of first cavities with said plurality of second cavities interleaved about said longitudinal axis and substantially-entirely along said circumference of said gap between adjacent ones of said plurality of first cavities; and, a second end member disposed in spaced relation to said first end member and secured across said second end of said flexible wall such that a substantially fluid tight seal is formed therebetween.

14. A gas spring assembly according to claim 13 further comprising a retaining ring extending peripherally about said first end member and in abutting engagement along said portion of said flexible wall extending along said outer crimp wall.

15. A gas spring assembly according to claim 13, wherein said second end member includes a side wall having an outer surface, and a portion of said flexible wall abuttingly engages said outer surface of said side wall such that a rolling lobe is formed therealong that is displaceable along said side wall during extension and compression of said gas spring assembly.

16. A suspension system comprising:
a pressurized gas system including a pressurized gas source and a control device; and,
at least one assembly according to claim 13 disposed in fluid communication with said pressurized gas source through said control device.

17. A gas spring assembly according to claim 13, wherein said second end member includes a chamber formed therein and in fluid communication with said spring chamber.

18. An end member dimensioned for securement to an associated flexible wall for forming an associated gas spring assembly, said end member comprising:

an end wall having a longitudinal axis and extending outwardly to an outer peripheral edge;

an outer crimp wall extending axially from along said end wall and including an outer surface dimensioned to receive a portion of the associated flexible wall;

an inner crimp wall disposed radially inward from said outer crimp wall such that a gap is formed between said inner crimp wall and said outer crimp wall, said gap having a circumference extending substantially-entirely about said longitudinal axis, said inner crimp wall extending axially from along said end wall in a common direction with said outer crimp wall such that at least a portion of said inner crimp wall is co-extensive with said outer crimp wall; and, a plurality of pairs of connector walls extending between and operatively interconnecting said outer crimp wall and said inner crimp wall across said gap therebetween, said plurality of pairs of connector walls including a first connector wall disposed at a first angle relative to the associated radial reference line and a second connector wall disposed at a second angle relative to the associated radial reference line such that a first cavity is formed between at least said first connector wall, said second connector walls and said outer crimp wall;

said plurality of pairs of connector walls disposed in circumferentially-spaced relation to one another about said longitudinal axis such that a plurality of first cavities are disposed in spaced relation to one another about said longitudinal axis with a second cavity formed by at least said first connector wall of one pair, said second connector wall of an adjacent pair and said inner crimp wall such that a plurality of second cavities are disposed about said longitudinal axis with said plurality of second cavities interleaved between adjacent ones of said plurality of first cavities such that said pluralities of first and second cavities are disposed in alternating orientations with respect to one another about said longitudinal axis and substantially-entirely along said circumference of said gap.

19. An end member according to claim 18, wherein said plurality of first cavities are of an approximately common size, and said plurality of second cavities are of an approximately common size that is different from said plurality of first cavities.

20. An end member according to claim 18, wherein said plurality of first cavities of an approximately common shape, and said plurality of second cavities are of an approximately common shape that is different from said plurality of first cavities.

* * * * *

UNITED STATES PATENT AND TRADEMARK OFFICE
CERTIFICATE OF CORRECTION

PATENT NO. : 9,541,150 B2  
APPLICATION NO. : 14/013394  
DATED : January 10, 2017  
INVENTOR(S) : Brian S. DeBruler It is certified that error appears in the above-identified patent and that said Letters Patent is hereby corrected as shown below:

On the Title Page

There is no indication of the Related U.S. Application Data. As such, please add Item (60) and insert -- Provisional Application No. 61/696,060, filed August 31, 2012 --.

Signed and Sealed this
Twenty-first Day of March, 2017

Michelle K. Lee
*Director of the United States Patent and Trademark Office*